United States Patent [19]

Veach et al.

[11] 4,253,026
[45] Feb. 24, 1981

[54] LOW TEMPERATURE ION SOURCE FOR CALUTRONS

[75] Inventors: Allen M. Veach; William A. Bell, Jr., both of Oak Ridge; George D. Howell, Jr., Clinton, all of Tenn.

[73] Assignee: The United States of America as represented by the United States Department of Energy, Washington, D.C.

[21] Appl. No.: 83,507

[22] Filed: Oct. 10, 1979

[51] Int. Cl.³ .............................................. H01J 27/00
[52] U.S. Cl. .................................. 250/426; 250/423 R
[58] Field of Search ............................ 250/423 R, 426

[56] References Cited

U.S. PATENT DOCUMENTS 3,272,983  9/1966  Veach et al. .......................... 250/426
3,479,545  11/1969  Wilson et al. ......................... 250/426

Primary Examiner—Harold A. Dixon
Attorney, Agent, or Firm—James E. Denny; Stephen D. Hamel; Louis M. Deckelmann

[57] ABSTRACT

A new ion source assembly for calutrons has been provided for the efficient separation of elements having high vapor pressures. The strategic location of cooling pads and improved insulation permits operation of the source at lower temperatures. A vapor valve constructed of graphite and located in a constantly increasing temperature gradient provides reliable control of the vapor flow from the charge bottle to the arc chamber. A pronounced saving in calutron operating time and equipment maintenance has been achieved with the use of the present ion source.

4 Claims, 2 Drawing Figures

LOW TEMPERATURE ION SOURCE FOR CALUTRONS

BACKGROUND OF THE INVENTION

The present invention relates to an ion source assembly for calutrons and more particularly to an improved assembly that provides for the efficient separation of elements having high vapor pressures while at the same time permitting operation of the source assembly at lower temperatures and providing reliable control of the vapor flow from the charge bottle to the arc chamber. It is the result of a contract with the U.S. Department of Energy.

The calutron (electromagnetic) separation of isotopes begins with the vaporization of the element to be separated. Ideally, the vapor is supplied to the ionization chamber at a controlled rate so that optimum operating conditions can be established and maintained. This is accomplished by applying heat to a charge bottle containing the material to be separated and allowing the vaporized material to pass into the ionization chamber. The amount of heat to be applied is determined by the vapor pressure of the material to be vaporized and must be controlled accordingly. Excessive heat results in excessive vapor being discharged into the ionization chamber and electrode area. This has a detrimental effect on the equipment and the amount and purity of the product, as previously described in U.S. Pat. No. 3,098,123. Control of the heat and subsequent control of the vapor is particularly critical in the separation of an element (e.g., mercury) having a high vapor pressure and requiring a low operating temperature.

Difficulties encountered in previous separations of mercury created a need to improve the heat and vapor control in the ion source utilized in such separations. In prior ion sources, the heat generated within the equipment and acting on the charge bottle contributed to the problem of overheating. This unpredictable and uncontrollable heat from source drains, electrode drains, arc power and filament power preempts the applied heat causing erratic fluctuations in the vaporization pattern. Previous attempts to correct the problem for mercury isotope separation are described below.

1. A cast copper holder for the charge bottle equipped with a cooling coil for circulating cooling water was used to overcome the extraneous heat effect. This was mildly successful, but the time lag involved in this dual control caused over-shooting or under-shooting of the heaters. The copper was subject to corrosion and the unit was difficult to clean and service.

2. A vapor valve between the charge bottle and the ionization chamber was tried but was unsuccessful in controlling the vapor flow because of plugging.

3. Mercury metal was tried as an external charge, but the problem of adequately heating the supply line was never satisfactorily solved.

4. A method is described in U.S. Pat. No. 3,700,892 in which an internal mercury charge was heated by circulating water at a temperature of 100° C. through a liner adjacent to the charge bottle. The effect of extraneous heat was eliminated, but the proper mercury charge vapor for optimum source operation was never reached with the heat supply limited to the 100° C. water. Another objectional feature of this system was the safety hazard involved in manipulating the hot water line connections.

5. The most recent mercury separation was accomplished by using HgCl as a charge feed. This feed was used to obtain some increase in ion output and to eliminate the safety hazard that was present in the hot water heated system. Extraneous heat was again a problem producing unstable performance. The greatest difficulty was caused by the release into the system of HgCl and $Cl_2$ gas. These caused high background pressures and required calcium pumping to lower the pressure. By the chemical action of the Ca with HgCl and $Cl_2$, hydroscopic $CaCl_2$ was deposited on surfaces of the equipment. When the system was let down to air, the Ca and $CaCl_2$ reacted with $H_2O$ in the air and large amounts of the $H_2O$ were retained on the surfaces of the source, receiver, liner and manifold. It was necessary to remove this residual moisture by outgassing before another run could be started. Complete outgassing of a unit required 20–60 hours and in many cases the liner receiver and the source components had to be washed before acceptable operating pressure could be attained. The cost of operating a calutron is approximately $30.00 per tank hour and this pump-down or outgassing time adds to the cost of the isotopes which is eventually borne by the users of the isotopes.

It is the primary object of the present invention to provide an improved ion source assembly for calutrons for achieving an efficient separation of elements having high vapor pressures, for permitting operation of the source at lower temperatures, and for achieving reliable control of the vapor flow in the source to provide optimum source operation.

Other objects, advantages and novel features of the invention will become apparent to those skilled in the art upon examination of the following detailed description of a preferred embodiment of the invention and the accompanying drawings.

SUMMARY OF THE INVENTION

The invention is an ion source assembly for calutrons utilizing high vapor pressure elements. A lower charge bottle containing a charge material element communicates with an upper charge bottle (enclosing an electrical heater) by means of a plate provided with a triangular-shaped orifice and positioned between the charge bottles. A movable graphite gate valve member is associated with the orifice to provide a desired variation in the area of the orifice and thus the vapor flow therethrough. An arc discharge chamber, heated by a second electrical heater, communicates with the interior of the upper charge bottle by means of a vapor feed-through nipple. The arc column established in the arc chamber is positioned between the ion exit slit of the chamber and an arc plate which is utilized for directing charge vapors vertically into the arc column, and means are provided for cooling the exterior of the charge bottles. The use of graphite construction for most of the parts of the source assembly and positioning the adjustable vapor valve, which is non-clogging, in a constantly increasing temperature gradient provide a means to accurately regulate vapor flow to the source arc chamber for ionization.

DESCRIPTION OF THE PREFERRED EMBODIMENT

Figure 1:
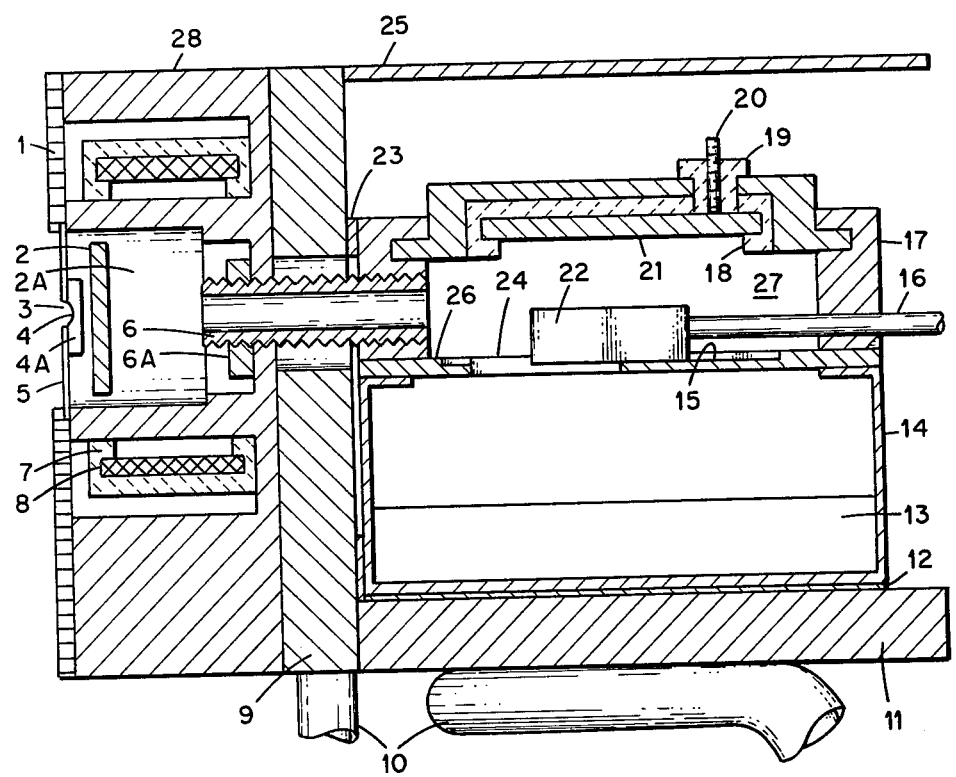
FIG. 1 is a schematic sectional drawing of the present ion source illustrating the various parts thereof and showing their relationship to each other.

Referring to FIG. 1, a charge material 13 is adapted to be heated by a graphite heater 21 held in a lava insulator 18 which is mounted in the upper portion of an upper graphite charge bottle 17 which is attached to a graphite removable lid 26. There is a charge bottle heater connector 20 through which a source of electrical power, not shown, is connected to the heater 21. The connector 20 is insulated from the graphite charge bottle 17 by a heater feed-through insulator 19 constructed of lava, and this insulator maintains a vapor seal so that no charge material can exit the system at this point.

Figure 2:
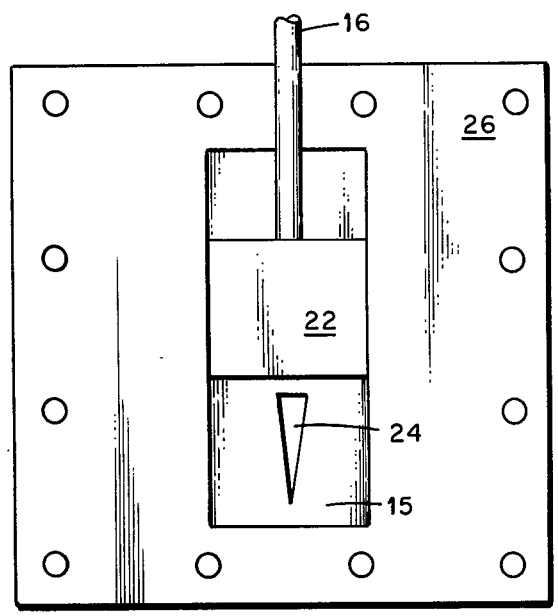
FIG. 2 is an enlarged schematic drawing of a top view of the vapor control valve portion of the ion source of FIG. 1.

A lower charge bottle reservoir 14 constructed from stainless steel contains the charge material 13 therewithin, and the charge material vapors exiting from the reservoir 14 pass through an orifice 24 (see FIG. 2) into the atrium 27 of the upper charge bottle 17. The orifice 24 is triangular in shape and the area of this orifice is varied as needed or required by a graphite gate 22 thereby controlling the amount of charge vapor leaving the lower portion 14 of the charge bottle and thus regulating the amount of charge vapor fed to the upper charge bottle 17. The charge vapors then pass from the atrium 27 of the upper charge bottle 17 through a graphite charge transfer nipple 6 into the arc chamber 2A of the device. A graphite arc plate 2 directs the vapors into the arc column 4A vertically. The arc column 4A is established between suitable arc electrodes, not shown, in a conventional manner. An ion sheath focal meniscus 4 is formed in the arc column 4A and ions exit from the source through an ion exit aperture 3.

The orifice 24, being triangular in shape, provides for exponential control (over several orders of magnitude) for various type charges. A stainless steel push rod 16 affixed to the valve gate 22 for regulating the position thereof is controlled by a reduction electric motor, not shown, which has a reversible capability. Motor operation, and thus, vapor control, can be accomplished at the ion source control console by an operator.

A charge bottle thermal plate 11 made of copper is mounted adjacent to the lower charge bottle 14 with a 1/32-inch graphite spacer 12 positioned therebetween. A graphite housing 28 encloses the arc chamber 2A, a graphite heater 8 mounted in a lava insulator 7 encompasses the arc chamber 2A for supplying heat thereto, a graphite arc chamber cover 1 is provided with an ion exit slit 5, the arc plate 2 positioned immediately behind the arc column 4A for directing charge vapors vertically thereunto, and arc electrodes mentioned above for establishing the arc column 4A comprise the arc chamber structure of the source. The nipple 6 extends into the arc chamber 2A and is held in place by means of a nipple collar 6A.

A copper cooling pad 9 is mounted between the arc chamber housing 28 and the lower charge bottle 14 and the upper charge bottle 17 with a 1/32-inch graphite thermal spacer 23 positioned between the bottle 17 and the pad 9. Copper water lines 10 are provided for cooling the pad 9 and the thermal plate 11. A copper thermal cover 25 is provided and encompasses the charge bottles 14, 17, and is connected to the thermal plate 11 by means of screws such that it can be easily removed thereby giving immediate access to the charge bottles. The cover 25 is also adapted to be cooled by a water line 10, not shown. The removable lid 26 is provided with a recess 15 (see FIG. 2) in which the valve gate 22 is adapted to slide in response to movements of the actuating rod 16 coupled to the gate 22. It should be noted that there is a constantly increasing thermal gradient between the lower charge bottle 14 and the arc chamber 2A; that is, the interior of the bottle 17 is hotter than the interior of the charge bottle 14, and the interior of the arc chamber 2A is hotter than the interior of the upper bottle 17.

One of the main features of the valving system of the present invention is that the valve itself and the charge materials path from charge to arc are located in the above-mentioned constantly increasing thermal gradient. That is to say, once the vapor leaves the charge, it will never condense on any surface. There is no clogging of the valve because the valve assembly is located between the charge 13 and the heater 21. This feature allows the ion source to be used for low temperature solid compounds or elements as well as charges existing in the liquid state. Since all contact surfaces at the orifice are graphite, the valve is essentially self-lubricated. Graphite construction allows the valve to be operated at elevated temperatures without damage or malfunction. In addition, there is essentially no detrimental chemical action on the system from halide charges. There is no organic polymer packing that is usually encountered in valving systems which is subject to deterioration by heat and vacuum conditions. The push rod 16, for valve control, enters the bottle through the upper portion of the graphite charge bottle 17. This feature serves both as a packing seal and a lubricated (dry) feedthrough access.

The extraneous heat reaching the charge is minimized by the water-cooled pads and cover (9, 11, 25) surrounding the charge bottles. There is no charge oven (which is present on the standard graphite source). Another feature of the present ion source is that the arc plate 2 not only directs the charge vapor into the arc discharge but, being located immediately behind the arc, serves to ground out normally existing equipotential lines surrounding the arc column. When these lines fall solely outside the arc plasma, instabilities will usually occur because of abnormal ion and electron diffusion processes.

The following example is given as a further description of the operation and results of the invention.

EXAMPLE

The source was tested experimentally with mercury as an internal charge and after two months there was no evidence of corrosion or other deleterious effects on the equipment. A new run could be started, with full output of Hg isotopes, in about 2 hours, thus drastically reducing outgassing time between runs. The isotopic purity of the separated isotopes as indicated by an assay of the $^{196}$Hg which was 41.21% compares favorably with that of $^{196}$Hg collected using a conventional ion source. The $^{196}$Hg collected in a previous series using HgCl as a charge and a conventional source unit had an assay of 37.28%.

It should be noted that the separated, enriched isotopes of mercury are in very high demand, particularly $^{196}$Hg. Mercury-196 is used to produce $^{197}$Hg which is used in the detection of tumors of both the brain and portions of the urogential system. Sales of this isotope since 1967 have resulted in a revenue of 2.06 million dollars. Thus, the ability of the present ion source to efficiently and successfully run mercury metal for a feed charge will provide a great benefit to the enrichment program.

The present ion source can be used for any high vapor pressure element or compound charge in the electromagnetic isotope separation scheme. It can also find application in accelerators, ion implantation devices, sputtering studies and multiple charge ion source studies. In addition, the graphite valve system can be used for any low pressure metering system where corrosive chemicals and high temperature are prevalent.

The foregoing description of a preferred embodiment of the invention has been presented for purposes of illustration and description and is not intended to be exhaustive or to limit the invention to the precise form disclosed. It was chosen and described in order to best explain the principles of the invention and their practical application to thereby enable others skilled in the art to best utilize the invention in various embodiments as are suited to the particular use contemplated. It is intended that the scope of the invention be defined by the claims appended hereto.

What is claimed is:

1. In a system for the electromagnetic separation of the isotopes of a charge material element having a high vapor pressure, the improvement comprising an improved ion source assembly consisting of a lower charge bottle for enclosing a selected charge material element; an upper charge bottle positioned on top of said first charge bottle and defining an atrium; a plate member provided with a triangular-shaped orifice, said plate member positioned between said charge bottles, said orifice providing communication between said bottles; a movable gate valve member associated with said orifice to provide a desired variation in the area of said orifice and thus the vapor flow therethrough; a first electrical heater mounted in the upper wall of said upper charge bottle for supplying vaporizing heat to the charge material element within said lower charge bottle; an arc discharge housing provided with an internal arc discharge chamber and an ion exit slit; a second electrical heater mounted in said arc housing for heating said arc chamber; a vapor feed-through nipple coupled between said atrium and said arc chamber; means for establishing an arc column in said arc chamber adjacent to said ion exit slit; an arc plate mounted adjacent to said arc column for directing charge vapors vertically into said column; and cooling means positioned adjacent to said charge bottles for the cooling thereof, whereby a desired positioning of said gate valve member with respect to said orifice provides for an accurate and desired regulation of the vapor flow through the gate valve in a non-clogging manner to said arc chamber for the ionization of said charge vapors.

2. The source assembly set forth in claim 1, wherein said cooling means comprises a thermal plate mounted below said lower charge bottle with a thin thermal spacer positioned therebetween; a thermal cover spaced from and encompassing said charge bottles with the ends of said cover affixed to said thermal plate; a cooling pad mounted between said arc discharge housing and said charge bottles with a thin thermal spacer positioned therebetween; and cooling water lines mounted onto said thermal plate, onto said thermal cover and onto said cooling pad for minimizing any extraneous heat reaching the charge in said assembly.

3. The ion source assembly set forth in claim 2, wherein said charge material element is mercury.

4. The ion source assembly set forth in claim 3, wherein said plate member, said upper charge bottle, said gate valve member, said nipple, said arc chamber housing, said arc plate, and said heaters are constructed from graphite, said thermal plate, said thermal cover, said cooling pad, and said cooling water lines are constructed from copper, and said lower charge bottle is constructed from stainless steel.

* * * * *